United States

Holsinger et al.

4,055,733

Oct. 25, 1977

[54] LINE LEVEL SIGNAL MEASURING DEVICE

[75] Inventors: Jerry L. Holsinger, Boston; David E. Williams, Andover; Frank B. Lezotte, Chelmsford; Don I. Falkenstein, Burlington, all of Mass.

[73] Assignee: Intertel, Inc., Burlington, Mass.

[21] Appl. No.: 690,884

[22] Filed: May 28, 1976

[51] Int. Cl.² ............................................. H04B 3/46
[52] U.S. Cl. ............................ 179/175.3 R; 324/99 D
[58] Field of Search ...................... 179/175.3 R, 175; 324/99 D, 99 R

[56] References Cited

U.S. PATENT DOCUMENTS

| | | | |
|---|---|---|---|
| 3,349,195 | 10/1967 | Gray | 179/175 |
| 3,766,474 | 10/1973 | MacDonald | 324/99 D |
| 3,927,571 | 12/1975 | Athey | 324/99 D |

Primary Examiner—Douglas W. Olms
Attorney, Agent, or Firm—Cesari and McKenna

[57] ABSTRACT

A device for measuring the power of analog signals on telephone lines in a data communications network. A selection circuit couples a selected analog signal from one of the telephone lines to a measuring circuit. A full-wave rectifier and a low pass filter process and convey the selected signal to a plurality of open-loop comparators. Each comparator produces a binary signal that indicates whether the selected signal is greater or less than a reference power that corresponds to a predetermined power level. Each comparator energizes an inverter and driver that in turn energizes a light-emitting diode thereby to indicate the line signal power visually. However, the drivers are interconnected so only one light-emitting diode is energized at any given time. A blanking circuit disables the light-emitting diodes when rapid signal level changes occur. A self-testing circuit includes a damped oscillator for testing all the circuitry in the measuring device.

21 Claims, 5 Drawing Figures

LINE LEVEL SIGNAL MEASURING DEVICE

CROSS REFERENCE TO A RELATED APPLICATION

Ser. No. 665,256, filed Mar. 9, 1976 for an Automatic Switching Unit for Data Communications Network, assigned to the same assignee as the present invention.

BACKGROUND OF THE INVENTION

This invention relates to data communications networks and more specifically to a device for measuring the power level of signals in such a network.

A typical data communications network couples a data processing system, or some other source of data signals in digital form, at a central site with one or more terminals, data processing systems or other input/output devices that use digital data at various remote sites. In such a network, the data processing system at the central site includes means for transmitting a message in digital form that contains an address of and data for a particular remote device or system. A "modem" (i.e., a modulator-demodulator) encodes the digital data and modulates a carrier signal with the encoded digital data and transmits the modulated carrier signal over a telephone line to the remote sites, whereupon other modems at the remote sites demodulate and decode the incoming data thereby to receive the digital data for use by the selected device or system. When the device or system at the remote site generates data in digital form, the associated modem encodes that data and modulates a carrier signal with the encoded data for transmission back over the telephone line to the central site where the central site modem demodulates and decodes the signal to recover the digital data.

In some networks, it is possible to establish parallel communication paths through conventional telephone circuits. One such arrangement is shown in the foregoing U.S. Pat. Application Ser. No. 665,256. An analog bridge is interposed between the modem at the central site and the primary telephone connections to the remote sites. Direct access arrangements including dial telephones are then connected to each other output port on the bridge to establish communication paths to auxiliary inputs of particular remote sites. If there is a problem on the primary telephone connection, a person at the central site can establish communications through the secondary telephone lines and a corresponding output port.

In other applications it may be desirable to use such bridges, singly or in cascade, to increase the number of telephone lines that are connected to a modem. For example, a typical bridge may contain a connection for a private line plus eight additional lines. It is possible therefore to connect eight additional private lines to the modem through this device, so long as transmissions from the central site may be in parallel to all nine private lines and the incoming signals, in parallel from all the lines, can be summed in analog fashion, because such bridges performs no multiplexing functions.

Oftentimes network problems can be diagnosed by measuring the power of the signals on the telephone line. In prior data communications networks, complex measuring devices have been used to make these measurements. However, these various measuring devices are often difficult to read in a dynamic environment such as is encountered in a multi-point network that operates over telephone lines. Moreover, they are sometimes difficult to use, especially if it is desirable to make any adjustments of the bridge to compensate for average signal levels.

Therefore, it is an object of this invention to provide a device for measuring the power of a modulated carrier signal in a data communications network.

Another object of this invention is to provide a device for measuring the power of a signal on a telephone line that is easy to use and which provides easily readable results.

Still another object of this invention is to provide a line level measuring device that is adapted for use in conjunction with an analog bridge in a data communications network.

Still another object of this invention is to provide a line level measuring device that includes circuits for testing the operation of the device.

SUMMARY OF THE INVENTION

In accordance with this invention, a line level measuring device for an analog signal energizes one of a plurality of visual indicators. Each indicator corresponds to a predetermined power level. The analog signal is compared with a number of reference signals, each of which also corresponds to one of the predetermined power levels. Binary output signals that represent the results of each comparison energize one of the visual indicators thereby to provide visual indication of the power level of the analog signal.

This invention is pointed out with particularity in the appended claims. The above and further objects and advantages of this invention may be better understood by referring to the following detailed description taken in conjunction with the accompanying drawings.

DESCRIPTION OF AN ILLUSTRATIVE EMBODIMENT

Figure 1:
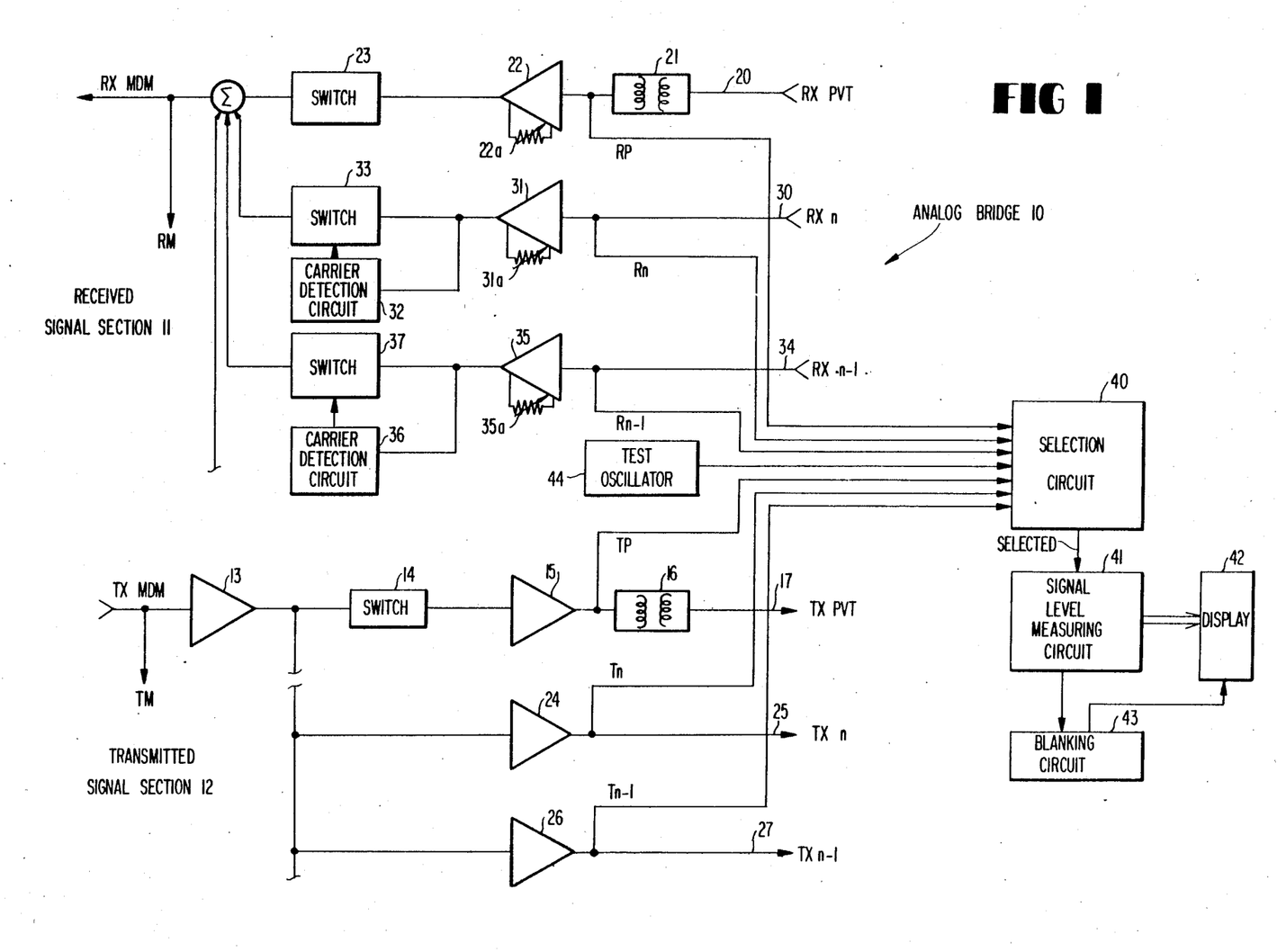
FIG. 1 is a schematic of an analog bridge that incorporates a line level measuring device constructed in accordance with this invention.

As shown in FIG. 1, an analog bridge 10 includes a received signal section 11 and a transmitted signal section 12. The transmitted signal section 12 receives TX MDM modulated carrier signals in analog form from a central site. An amplifier circuit 13 (shown diagramatically) couples these signals through a switch 14 to another amplifier circuit 15. The output signals from the amplifier circuit 15 then pass through an impedance matching network 16 that includes an isolating transformer to be applied to a telephone line 17 that conveys the transmitted signals over the private line, these signals being designated TX PVT signals.

When a device at a remote site transmits a message, the incoming signals on a private line 20, designated RX PVT signals, pass through an impedance matching network 21 to a variable gain amplifier 22 and a switch 23 to become RX MDM signals that are coupled to the demodulator section of a modem at the central site. The switches 14 and 23 are manual disconnect switches that are conductive during normal operations.

The analog bridge 10 provides parallel signal paths. For example, the output signals from the amplifier circuit 13 are also coupled through a parallel amplifier circuit 24 onto conductor 25 as TXn signals and through an amplifier circuit 26 onto a conductor 27 as TXn−1 signals. In an application such as shown in U.S. patent application Ser. No. 665,256, each of the TXn and TXn−1 signals would be coupled to a direct access arrangement. Any number of such amplifier circuits may be connected in parallel to provide a corresponding number of parallel lines.

A conductor 30 receives an RXn signal over a data access arrangement that corresponds to the data access arrangement connected to the conductor 25. This signal passes to a variable gain amplifier 31. If a signal is present, a carrier detection circuit 32 closes a switch 33 thereby to couple the RXn signals to the modem as a component of the Rx MDM signals. Likewise another remote site that receives the TXn−1 signals on conductor 27 would transmit RXn−1 signals on conductor 34. These signals would pass through a variable gain amplifier 35 to cause a carrier detection circuit 36 to close a switch 37. Thus, the RX MDM signal is constituted by the analog sum of the signals that appear on all the incoming RX lines.

In accordance with this invention, a selection circuit 40 receives various signals from the analog bridge 10. An RP signal from the junction of the impedance matching network 21 and variable gain amplifier 22 constitutes one such input. Rn and Rn−1 signals, that correspond to the RXn and RXn−1 signals on conductors 30 and 34 respectively, are representative of other signals that are coupled to the selection circuit 40. A TP signal from the output of the amplifier 15 and Tn and Tn−1 from the outputs of the amplifiers 24 and 26 are also coupled with the selection circuit 40. The selection circuit 40 selects one of these analog signals as a selected signal that is an input to a signal level measuring circuit 41. This circuit 41 measures the signal and activates a display 42.

In accordance with other aspects of this invention a blanking circuit 43 monitors the operation of the signal level measuring circuit 41 and disables the display 42 whenever the measurements have no meaning power as when the level undergoes rapid and wide fluctuations. Moreover, a test oscillator 44 provides another input to the selection circuit 40. When the test oscillator 44 is selected, a testing signal is applied to the circuit 41 so all the circuitry in the selection circuit 40, signal level measuring circuit 41, display 42 and blanking circuit 43 is tested.

Figure 2:
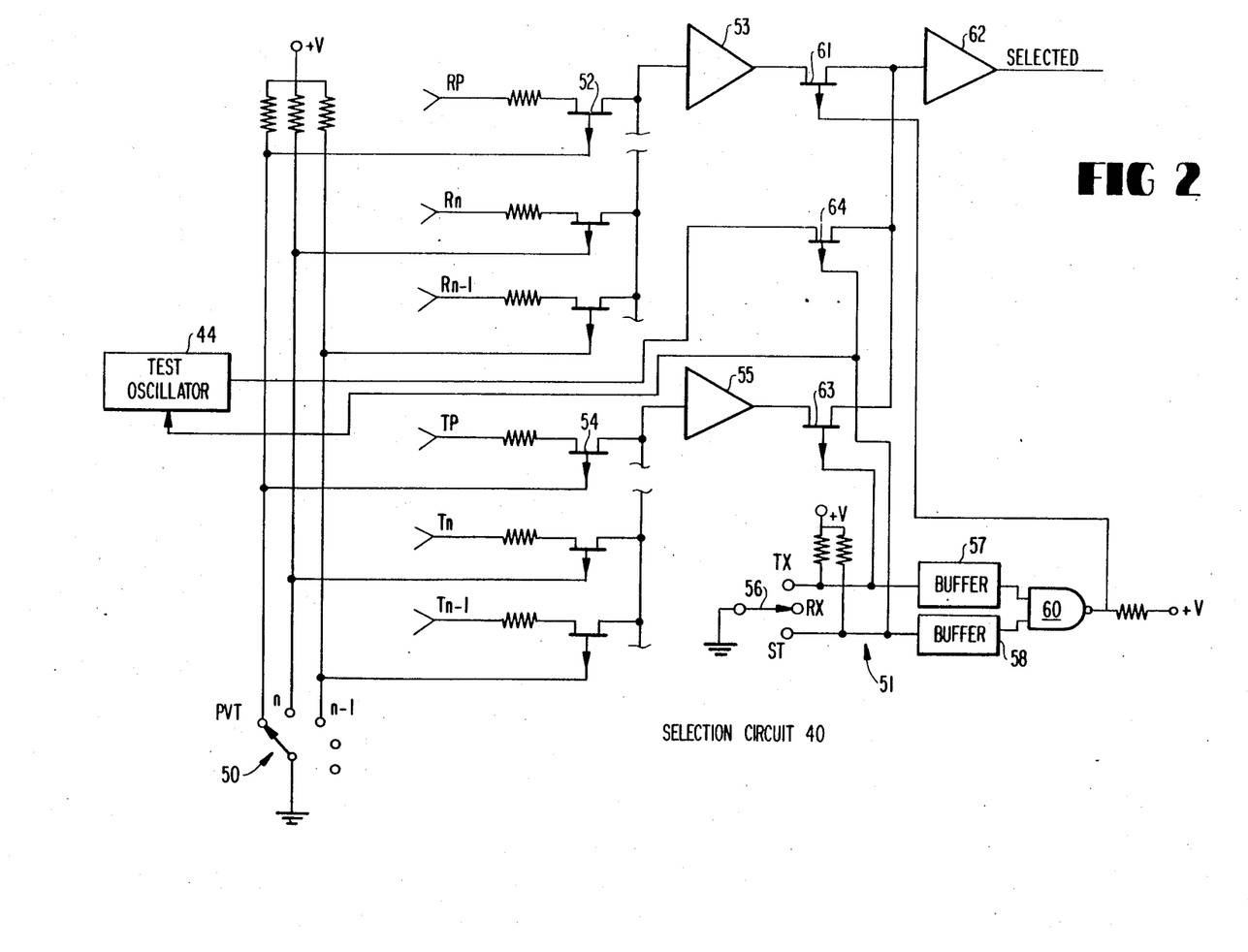
FIG. 2 is a schematic diagram of a selection circuit that is shown in FIG. 1.

Now referring to FIG. 2, a a switching assembly in the form of a switch 50 and a switching circuit 51 control the selection of a particular input. The switching assembly form of a single-pole, multiple-throw switch, selects a particular pair of corresponding lines. When the switch 50 is in the "PVT" position shown, it conditions a switch in the form of a field effect transistor (FET) 52 to to couple the RP signal from the impedance matching circuit 21 in FIG. 1 to an amplifier circuit 53. Simultaneously it conditions an FET 54 to couple the TP signal from the output of the amplifier circuit 15 in FIG. 1 to another amplifier circuit 55. When the switch 50 is in the "n" position, the Rn and Tn signals are coupled to the amplifier circuits 53 and 55 respectively while the Rn−1 and Tn−1 signals are coupled to those amplifier circuits when the switch 50 is in the "n−1" position.

The switching circuit 51 contains a single pole, three-position switch. As shown specifically the switch includes a wiper arm that can be shifted to a TX, an RX or an ST position. In one embodiment, the ST position is a momentary position. When the switch 56 is in the RX position, as shown, two buffer circuits 57 and 58 energize an NAND gate 60 thereby to condition a FET 61 to conduct and couple the output from the amplifier circuit 53 through an amplifier circuit 62 as the SELECTED signal. With the switch positions specifically shown in FIG. 2, the RP signal is selected by the switch 50 and the switching circuit 51 as the SELECTED signal. Moreover, FETs 63 and 64 are non-conductive and isolate the amplifier circuit 55 and the test oscillator 44 from the amplifier circuit 62. If the switch 56 is in the TX position, the NAND gate 60, the FET 61 and the FET 64 are off. However, the FET 63 conducts and couples the TP signal from the amplifier circuit 55 through the amplifier circuit 62 as the SELECTED signal.

Thus, if an operator at the central site desires to measure the power level on conductor 30, he moves the switch 50 to the "n" position and the switch 56 to the RX position. If he wishes to measure the power level on conductor 25 he positions the switch 50 at the "n" position and the switch 56 at the TX position. The operation of the circuit when the switch 56 is in the ST position is described later. Thus, the operator can select any one of the TX or RX signals as the SELECTED signal for transfer to the signal level measuring circuit 41 shown in FIG. 1.

Figure 3:
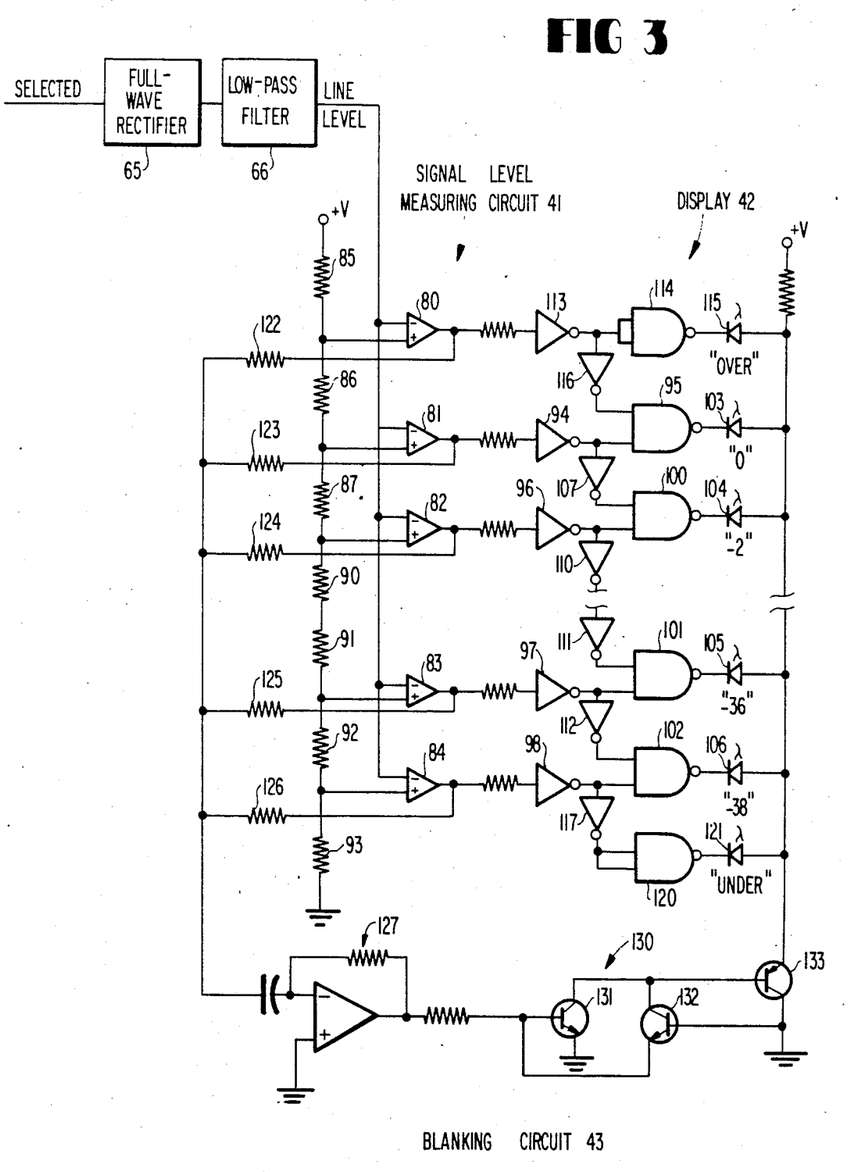
FIG. 3 is a schematic of a signal level measuring circuit, blanking circuit and display that are shown in FIG. 1.
Figure 4:
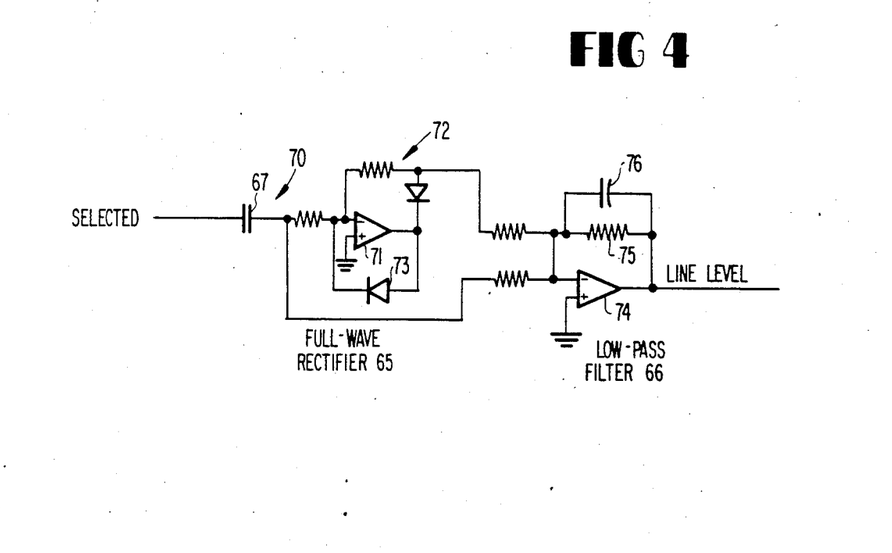
FIG. 4 is a detailed schematic of a full wave rectifier and low pass filter circuits that are shown in FIG. 3.

Now referring to FIG. 3, the SELECTED signal passes through a full-wave rectifier 65 and a low pass filter 66 to become a LINE LEVEL signal. In the full-wave rectifier 65, shown in detail in FIG. 4, an AC coupling circuit 70 couples the incoming SELECTED signal to the inverting input of an operational amplifier 71. A diode network 72 from the inverting input to the output conducts during positive half cycles. A diode network 73 from the output to the inverting input conducts during negative half cycles. Thus, a half-wave rectified signal is coupled to the low pass filter 66 to be summed with the SELECTED signal at the inverting input of an operational amplifier 74 to yield a full-wave rectified signal as an input to the low-pass filter 66. The filter 66 further comprises a resistor 75 and a parallel capacitor 76 in a negative feedback circuit. This circuit operates as a low pass filter with a time constant which is relatively short in comparison with the normally encountered rate of change of amplitude of the selected signal. In one embodiment, for example, the time constant for the resistor 75 and capacitor 76 is about 4 milliseconds. This eliminates certain high frequency noise from the SELECTED signal and produces a LINE LEVEL signal as a short-term average signal. However, with this time constant and the essentially constant impedance of the telephone line, the LINE LEVEL signal is a good representation of the energy of the signal on the line during the averaging period. The LINE LEVEL signal therefore also is a good representation of the power of the signals on the telephone line.

Referring again to FIG. 3, the LINE LEVEl signal from the low pass filter 66 passes to the signal level measuring circuit 41 and more specifically to the inverting inputs of a plurality of operational amplifiers. Each operational amplifier is in a circuit that corresponds to a particular predetermined power level that is established by a reference constituted by a voltage divider. In FIG. 3 only circuitry associated with five representative predetermined power levels is shown.

The LINE LEVEL signal is applied to the inverting inputs of open-loop operational amplifiers 80 through 84. The voltage divider is constituted by resistors 85, 86, 87, 90, 91, 92 and 93. The resistors are chosen so the reference voltages at the non-inverting inputs of the operational amplifiers correspond to a sequence of power levels measured in dbm. If the LINE LEVEL signal has a magnitude which is greater than the reference established at the input of the amplifier 82 but less than the amplifier 81, then the amplifier 82 and each of the amplifiers corresponding to lower power levels, such as the amplifiers 83 and 84, generate a negative output signal at the negative saturation level while the amplifiers 80 and 81 generate positive output signals at the positive saturation level. Thus, each amplifier acts as a comparator that produces a signal that shifts between positive and negative values (e.g., a binary signal or a two-level signal) and that indicates the relationship of the magnitude of the LINE LEVEL signal with the reference.

Each amplifier controls the energization of corresponding visual input indicating means. Thus, if the amplifier 81 produces a negative output signal, an inverter 94 produces a positive input signal at a NAND gate 95. Likewise, inverters 96, 97 and 98 provide inputs that enable NAND gates 100, 101 and 102, because the amplifiers 82, 83 and 84 also generate negative output signals when they represent lower power levels. Although the NAND gate 95 drives a visual indicating means, normally a light-emitting diode 103, into conduction, these NAND gates do not drive light emitting diodes 104, 105 and 106 because inverters 107 through 112 disable the drivers 100, 101 and 102. Thus, only the light-emitting diode 103 is illuminated.

In FIG. 3 numbers are written beneath each of the light emitting diodes 103 through 106. As the resistors 85 through 92 are selected so the reference voltages have a logarithmic relationship, these numbers directly indicate the magnitude of the signal in dbm.

In the foregoing example, the diode 103 lights and indicates an power level of 0 dbm. If the LINE LEVEL signal is greater than 0 dbm, the amplifier 80 and an inverter 113 cause a NAND gate driver 114 to energize an "OVER" light emitting diode 115. An inverter 116 then disables the NAND gate 94. If the LINE LEVEL signal is less than −38dbm, the inverter 98 causes an inverter 117 to energize a NAND gate driver 120 thereby to illuminate a "UNDER" light-emitting diode 121.

Therefore, the signal measuring circuit 41 and display 42 shown in FIGS. 1 and 3 provide a display of the power of the LINE LEVEL signal. The display is easy to read, especially when the lights are placed in an array in which each diode is ordered in the array according to its respective predetermined energy level. In one embodiment, the array comprises an arrangement of light-emitting diodes in a vertical line with the "OVER" light-emitting diode 115 at the top and the "UNDER" light-emitting diode 131 at the bottom.

If the magnitude of the incoming signal changes, then different ones of the light-emitting diodes light in a mutually exclusive fashion. However, at certain rates the persistence of the eye may make it appear that more than one such light-emitting diode is illuminated simultaneously. When this occurs, the display 42 is difficult to interpret, so the blanking circuit 43 turns off the display 42 completely. More specifically, equally weighted resistors 122 through 126 couple the outputs of the amplifiers 80 through 84 to a summing junction at the input of a differentiating amplifier circuit 127. When the line level signal is changing at a sufficiently high rate, the output signal from the differentiating circuit 127 causes a full-wave rectifier 130 to conduct. The rectifier 130 comprises NPN transistors 131 and 132 and controls a switching transistor 133. More specifically, when the output signal from the circuit 127 exceeds about +0.6 volts, the transistor 131 conducts and turns on a transistor 133 thereby to ground the anodes of all the light-emitting diodes in the display 42. Likewise, when the output voltage becomes more negative than about −0.6 volts, the transistor 132 conducts and turns on the transistor 133. Within the range of −0.6 volts to +0.6 volts there is a deadband during which the display 42 operates normally.

Thus, the circuitry in FIG. 3 constitutes a device for measuring the power level of an analog signal that is easy to read and that provides a "real time" display of the signal levels. Moreover, the selection circuit 40 shown in FIG. 2 simplifies the use of this measurement device. This is especially true when it is desirable to adjust the gain of the amplifiers in the received signal section 11 shown in FIG. 1. Specifically, an operator can adjust the gain of the amplifying networks 22, 31 or 35 by means of gain adjustments resistors 22A, 31A and 35A, respectively, based upon the power level that is measured.

In accordance with another aspect of this invention, the measuring device shown in FIG. 1, including the selection circuit 40, the signal level measuring circuit 41, the display 42 and blanking circuit 43, can be tested merely by depressing the switch 56 in FIG. 2 to a momentary ST position. This enables a damped, constant frequency signal to pass from the test oscillator 44 through the selection circuit 40 to become the SELECTED signal. More specifically, when the switch 56 is held in the ST position, the FET 64 couples the output signals from the test oscillator 44 to the input of the amplifying network 62 while the switching circuit 51 conditions the FETs 61 and 63 to isolate the outputs of the amplifier circuits 53 and 55.

Figure 5:
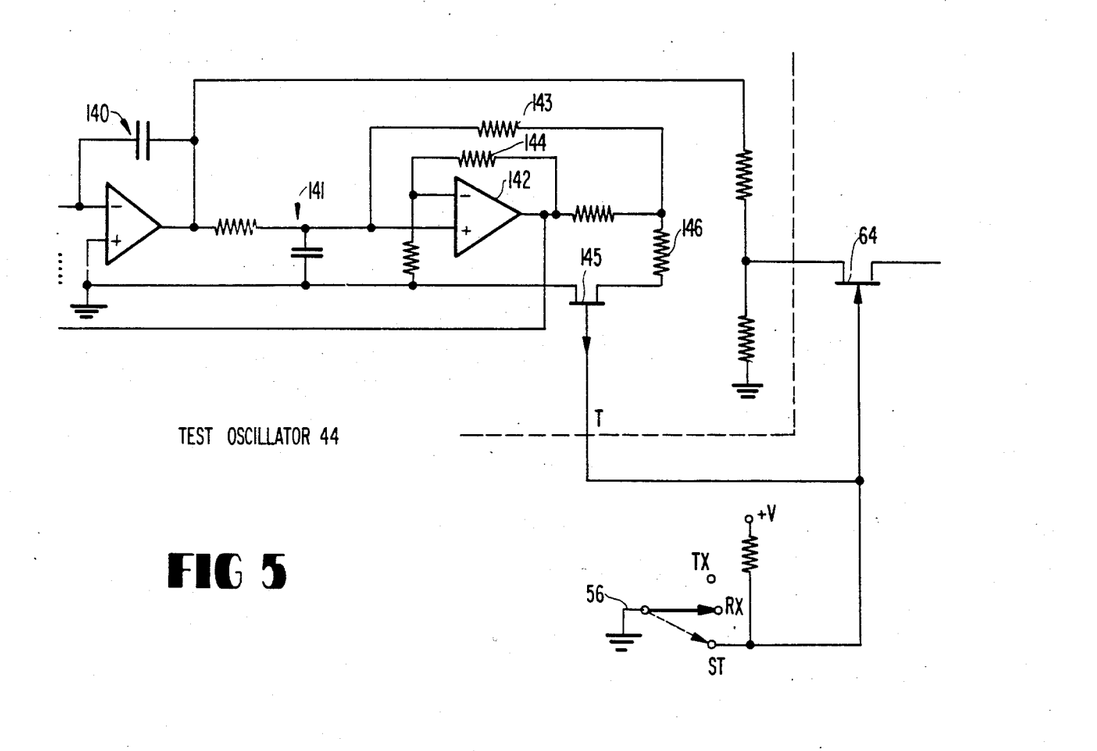
FIG. 5 is a detailed schematic diagram of a test oscillator circuit that is shown in FIGS. 1 and 2.

Now referring to FIG. 5, the test oscillator 44 comprises a conventional oscillator circuit including phase shifting networks 140 and 141 and an amplifying network 142 including positive and negative feedback resistors 143 and 144. This circuit is designed to oscillate at about 44 Hz. Moreover, when the switch 56 is in the RX position as shown in FIG. 5, an FET 145 that couples an output resistor 156 to ground is an open-circuit condition. In this configuration, the circuit oscillates and, due to the magnitude of the positive feedback, the oscillator circuit saturates. When the switch 56 moves to the ST position, represented by the dashed arrow in FIG. 5, the FET 145 couples the output from the amplifying network 142 to ground through the resistor 146. This reduces the overall gain to a point at which the test oscillator produces an exponentially damped, constant-frequency signal that is coupled from the phase shifting network 140 through the FET 64.

As the exponentially damped oscillator signal from the test oscillator 44 passes through the full-wave rectifier 65 and the low pass filter 66 shown in FIG. 3, it produces a LINE LEVEL signal that closely tracks the rectified oscillator output, which is a constant frequency. As the magnitude of the signal from the test oscillator decreases exponentially, the magnitude of the ripple on the rectified oscillator output also decreases exponentially. Moreover, during each cycle of the ripple, the magnitude of the signal change is greater than the difference of at least one threshold level defined by the resistors 85 through 93. As a result, the outputs of two or more adjacent comparators or amplifiers shift state to produce overlapping pulses. These pulses are coupled to the blanking circuit 43 and the change signal can increase to turn on the transistor 133 in FIG. 3 and blank the display. In one embodiment, at one level the amplifier 82 shifts state to turn on the diode 104, then the amplifiers 81 and 80 shift to a negative saturation state in sequence. Thereafter, the amplifiers 80 and 81 shift to positive saturation in sequence. At the time that the amplifier 81 enables the NAND gate 94, the input signal to the blanking circuit 43 causes the transistor 133 to conduct. Thus, only light-emitting diodes 104 and 115 are turned on; light-emitting diode 103 is off. As the magnitude of the LINE LEVEL signal decreases, it appears to the eye that successive sets of three light-emitting diodes are involved in the display, than the upper and lower light emitting diodes are on, that the middle light-emitting diode is off and that the display slides from the "OVER" light 115 to the "UNDER" light 121. Thus, the self-testing unit checks the operation of each of the threshold circuits by determining that each of the lights in fact turns on. Moreover, if the middle light in the display is always off, the blanking circuit 43 is operating properly. As the test signal passes through the full-wave rectifier 65 and low pass filter 66, the operation of these circuits is also verified as in the operation of the selection circuit 40. Thus, the self-testing circuitry provides a means for testing the operation of the circuits in the measuring device.

In summary, the measuring device disclosed generally in FIG. 1 and more specifically in FIGS. 2 through 5, represents a measuring device especially adapted for use in data communications systems that transmit data over telephone signals as analog signals. The power levels are easily determined and facilitate the adjustment of amplifier gain in the received signal section 11. Moreover, the display presented by a linear array of the light-emitting diodes is easy to read and facilitates the testing of the system under self-test conditions.

It will be apparent that a single specific embodiment of this invention has been shown. However, many variations of these circuits could be used to implement this invention and attain some or all of its advantages. Therefore, it is in the intent of the appended claims to cover all such variations and modifications as come within the true spirit and scope of this invention.

What is claimed as new and desired to be secured by Letters Patent of the United States is:

1. A device for providing a measurement that represents the power level of a complex, alternating-current signal being conveyed over a data communications line, said measurement device comprising:
    A. binary signal generating means having a plurality of outputs, each output corresponding to a different predetermined power level, said generating means generating binary signals at first ones of the outputs in a range defined by the value of the signal on the data communications line, binary signals being absent from the others of said outputs,
    B. a plurality of visual indicating means connected to said binary signal generating means and arranged in an array, each said visual indicating means corresponding to a different predetermined power level of the signal on the data communications line and to an output of said binary signal generating means representing the same predetermined signal value, corresponding ones of said visual indicating means and said outputs being interconnected, and
    C. blanking means connected to all of said visual indicating means and to said binary signal generating means for disabling said visual indicating means upon sensing a predetermined condition of the signal on the data communications line.

2. A measurement device as recited in claim 1 wherein said binary signal generating means includes:
    i. threshold means for generating each binary signal, each said threshold means receiving signal as a first input signal that is dependent upon the analog signal, and
    ii. reference means for generating a plurality of reference signals corresponding to each of the predetermined power levels, each said reference signal being coupled as a second input signal to corresponding one of the threshold means.

3. A measurement device as recited in claim 2 wherein the array of said visual indicating means indicates power levels over a range of predetermined levels and said binary signal generating means additionally includes means connected to each of said threshold means for conditioning an adjacent threshold means in the range to disable the binary signal therefrom.

4. A measurement device as recited in claim 1 wherein said blanking means comprises:
    i. means for generating a change signal that is dependent upon the rate at which the power level of the signal on the data communications line changes, and
    ii. means responsive to a predetermined magnitude of the change signal for disabling all said plurality of visual indicating means.

5. A measurement device as recited in claim 2 wherein each of said visual indicating means comprises a light-emitting diode.

6. A measurement device as recited in claim 2 wherein said threshold means includes:
    i. a plurality of threshold circuits, each said threshold circuit producing a two-level output signal,
    ii. driving means responsive to a first level of the output signal for energizing the corresponding one of said visual indicating means, and
    iii. means connecting the output of a said threshold circuit to a said driving means connected to said threshold means corresponding to an adjacent visual indicating means in the array for disabling said driving means when said threshold circuit energizes said visual indicating means.

7. A measurement device as recited in claim 6 wherein said threshold circuit comprises comparator means having a first input connected to receive the first input signal and a second input connected to receive a corresponding one of the threshold reference signals, and wherein said means for interconnecting said threshold circuits comprises a plurality of inverters, each said inverter connecting the output of a said threshold circuit to an input of said driving means connected to the adjacent threshold circuit.

8. A measurement device as recited in claim 7 said blanking means includes:
 i. summing means combining the outputs of each of said comparators,
 ii. differentiation means connected to said summing means for generating a change signal, and
 iii. switch means responsive to a predetermined magnitude of the change signal for disabling all said visual indicating means.

9. A measurement device as recited in claim 7 wherein said binary signal generating means additionally includes:
 i. a rectifier for converting the signal on the data communications line to be measured to a rectified signal, and
 ii. a filter for converting the rectified signal from said rectifier to the input signal applied to each of said comparators.

10. A measurement device as recited in claim 2 additionally comprising:
 C. selectively operable testing means connected to said binary signal generating means for testing the operation of of said binary signal generating means and said visual indicating means.

11. A measurement device as recited in claim 10 wherein said testing means comprises:
 i. an oscillator,
 ii. switch means for coupling the output of said oscillator to said binary signal generating means in place of the signal on the data communications line thereby to isolate said measurement device from the data communications line, and
 iii. means responsive to the switch means for causing said oscillator to operate as a damped oscillator.

12. A device for providing a measurement that represents the power level of a modulated carrier signal on one of a plurality of communications lines in a data communications network, said measurement device comprising:
 A. line selection means connected to all the communications lines for coupling a selected one of the modulated carrier signals to the output thereof as a selected signal,
 B. a plurality of visual indicating means arranged in an array, each said visual indicating means corresponding to a different predetermined power level,
 C. means for generating a plurality of binary signals at the corresponding outputs thereof, the binary signals being dependent upon the power level of the modulated carrier signal at an input of said generating means, each said binary signal output being connected to energize a corresponding one of said visual indicating means thereby to display visually the power level of the modulated carrier signal, and
 D. blanking means connected to all of said visual indicating means and to said binary signal generating means for disabling all said visual indicating means upon sensing a predetermined condition of the modulated carrier signal.

13. A measurement device as recited in claim 12 wherein said selection means comprises:
 i. an amplifier for generating the selected signal,
 ii. selection switch means selectably set to identify one of the plurality of communications lines, and
 iii. circuit means connected to each of the communications lines and to said switching means for coupling the modulated carrier signal from the selected communications line to said amplifier means.

14. A measurement device as recited in claim 13 wherein the communications lines are segregated into first and second groups, each communications line in the first group having a corresponding communications line in the second group, and wherein said selection switch means includes:
 a. first switch for selecting corresponding communications lines in the first and second groups, and
 b. second switching means for selecting one of said groups thereby to couple the selected signal through said circuit means to the said amplifier means.

15. A measurement device as recited in claim 12 wherein said binary signal means includes:
 i. a plurality of threshold means, each said threshold means generating a binary signal and receiving a signal at a first input that is dependent upon the selected signal, and
 ii. reference means for generating a plurality of reference signals corresponding to each of the predetermined power levels, each said reference signal being a second input signal to a corresponding one of said threshold means.

16. A measurement device as recited in claim 15 wherein said blanking means comprises:
 i. summing means combining the outputs of said threshold means,
 ii. differentiation means connected to said summing means for generating a change signal, and
 iii. switch means responsive to a predetermined magnitude of the change signal for disabling all said visual indicating means.

17. A measurement device as recited in claim 15 wherein said binary signal generating means include:
 i. a rectifier for converting the selected signal to a rectified signal, and
 ii. a filter for converting the rectified signal from said rectifier to the input signal applied to each of said threshold circuits.

18. A measurement device as recited in claim 12 additionally comprising a testing circuit for generating a test signal, said line selection means receiving means for coupling the test signal to the output thereof as the selected signal.

19. A measurement device as recited in claim 18 wherein said testing circuit includes:
 i. an oscillator, and
 ii. means responsive to said line selection means for causing said oscillator to operate as a damped oscillator.

20. A device for providing a measurement that represents the power level of a complex, alternating-current signal being conveyed over a data communications line, said measurement device comprising:
 A. binary signal generating means having a plurality of outputs, each output corresponding to a different predetermined energy level of the signal on the data communications line, said generating means generating a binary signal at each of first ones of the outputs in a range defined by the value of the signal on the data communications line, binary signals being absent from the others of the outputs,
 B. A plurality of visual indicating means arranged in an array, each said visual indicating means corresponding to a different predetermined power level of the signal on the data communications line and therefor corresponding to an output of said binary signal generating means representing the same predetermined energy level and each said visual indicating means having a first terminal connected to a common supply bus, and C. gating means interconnecting said binary signal generating means outputs and second terminals of said visual indicating means for energizing only the visual indicating means corresponding to the power then present in the signal on the data communications line.

21. A measurement device as recited in claim 20 additionally comprising:

D. input means that are connectible to the data communications line for generating a variable direct-current signal having a value that is dependent upon the power level of the signal on the data communications line.

* * * * *

UNITED STATES PATENT AND TRADEMARK OFFICE
CERTIFICATE OF CORRECTION

PATENT NO. : 4,055,733

DATED : October 25, 1977

INVENTOR(S) : Jerry L. Holsinger, David E. Williams,
Frank B. Lezotte, Don I. Falkenstein It is certified that error appears in the above-identified patent and that said Letters Patent are hereby corrected as shown below:

```
Column 1, Line 60, "performs" should be -- perform --.
Column 2, Line 56, "diagramati-" should be -- diagrammati- --.
Column 3, Line 40, "se-" should be -- SE
Column 3, Line 41, "lected" should be -- LECTED --.
Column 3, Lines 47,48, "meaning power as when the level
          undergoes rapid" should be -- meaning, as when
          the power level undergoes rapid --.
Column 3, Line 55, "a a" should be -- a --.
Column 3, Line 62, "to to" should be -- to --.
Column 4, Line 10, "an" should be -- a --.
Column 4, Line 65, "LEVE1" should be -- LEVEL --.
Column 5, Line 46, "an" should be -- a --.
Column 5, Line 60, "energy" should be -- power --.
Column 5, Line 64, "131" should be -- 121 --.
Column 6, Line 31, "adjustments" should be -- adjustment --.
Column 7, Line 35, "as" should be -- is --.
Column 9, Line 23, "of of" should be -- of --.
Column 10, Line 57, "energy" should be -- power --.
```

Signed and Sealed this

Eleventh Day of December 1979

[SEAL]

Attest:

SIDNEY A. DIAMOND

Attesting Officer

Commissioner of Patents and Trademarks